(12) United States Patent
Bridle et al.

(10) Patent No.: US 10,029,933 B2
(45) Date of Patent: Jul. 24, 2018

(54) INTEGRATED UTILITY SYSTEM

(75) Inventors: Trevor Redvers Bridle, Perth (AU); Ian Moncrieff, Marlborough (NZ)

(73) Assignee: Trevor Redvers Bridle, Perth (AU)

( * ) Notice: Subject to any disclaimer, the term of this patent is extended or adjusted under 35 U.S.C. 154(b) by 524 days.

(21) Appl. No.: 12/445,064

(22) PCT Filed: Oct. 8, 2007

(86) PCT No.: PCT/NZ2007/000297
§ 371 (c)(1),
(2), (4) Date: Apr. 9, 2009

(87) PCT Pub. No.: WO2008/044945
PCT Pub. Date: Apr. 17, 2008

(65) Prior Publication Data
US 2010/0089809 A1  Apr. 15, 2010

(30) Foreign Application Priority Data
Oct. 9, 2006  (NZ) ................. 2006905601

(51) Int. Cl.
*C02F 9/00* (2006.01)
*C02F 1/02* (2006.01)
(Continued)

(52) U.S. Cl.
CPC ............. *C02F 9/00* (2013.01); *C02F 1/02* (2013.01); *C02F 1/283* (2013.01); *C02F 1/441* (2013.01); *C02F 1/442* (2013.01); *C02F 1/444* (2013.01); *C02F 1/50* (2013.01); *C02F 1/52* (2013.01); *C02F 11/06* (2013.01); *C02F 11/12* (2013.01); *C02F 11/121* (2013.01); *C02F 11/122* (2013.01); *C02F 11/127* (2013.01); *C02F 11/14* (2013.01); *C02F 2001/007* (2013.01); *C02F 2201/009* (2013.01); *C02F 2209/008* (2013.01); *C02F 2303/04* (2013.01);
(Continued)

(58) Field of Classification Search
CPC ................... C02F 9/00; Y02E 20/14
USPC ........................................... 210/769
See application file for complete search history.

(56) References Cited

U.S. PATENT DOCUMENTS 3,954,605 A    5/1976  Davies et al.
3,986,955 A  * 10/1976  Plicque ................. 203/11
(Continued)

FOREIGN PATENT DOCUMENTS

AU    755598 B2   10/1999
DE    4420111 A1  12/1995
(Continued)

OTHER PUBLICATIONS

International Preliminary Report on Patentability for International Application No. PCT/NZ2007/000297,Published: Feb. 6, 2009, pp. 1-7, Publisher: International Patentability Examination Authority.
(Continued)

*Primary Examiner* — Peter Keyworth
(74) *Attorney, Agent, or Firm* — Hultquist, PLLC; Steven J. Hultquist

(57) ABSTRACT

An integrated utility system (10) comprising; i) a power supply (12); and ii) a wastewater treatment system (20), wherein waste energy from the power supply (12) is utilized in the wastewater treatment system (20).

18 Claims, 1 Drawing Sheet

(51) Int. Cl.

| | | |
|---|---|---|
| C02F 1/28 | (2006.01) | |
| C02F 1/44 | (2006.01) | |
| C02F 1/50 | (2006.01) | |
| C02F 11/06 | (2006.01) | |
| C02F 11/12 | (2006.01) | |
| C02F 1/52 | (2006.01) | |
| C02F 11/14 | (2006.01) | |
| C02F 1/00 | (2006.01) | |

(52) U.S. Cl.
CPC ...... *C02F 2303/10* (2013.01); *C02F 2303/24* (2013.01); *C02F 2303/26* (2013.01); *Y02A 20/212* (2018.01); *Y02E 20/12* (2013.01); *Y02E 20/14* (2013.01); *Y02E 50/11* (2013.01); *Y02T 10/16* (2013.01); *Y02W 10/30* (2015.05); *Y02W 10/37* (2015.05); *Y02W 10/40* (2015.05)

(56) References Cited

U.S. PATENT DOCUMENTS

| | | | |
|---|---|---|---|
| 4,052,858 A | | 10/1977 | Jeppson |
| 4,321,151 A | * | 3/1982 | McMullen ............ 210/769 |
| 4,749,992 A | | 6/1988 | Fitzemeyer et al. |
| 5,346,592 A | | 9/1994 | Mandani |
| 5,744,037 A | | 4/1998 | Fujimura et al. |
| 7,005,068 B2 | * | 2/2006 | Hoffland ............ 210/603 |
| 7,037,430 B2 | | 5/2006 | Donaldson et al. |
| 2003/0028269 A1 | * | 2/2003 | Spriggs et al. ............ 700/83 |
| 2005/0029174 A1 | * | 2/2005 | Collins ............ 210/143 |
| 2006/0243648 A1 | * | 11/2006 | Shain et al. ............ 210/175 |
| 2007/0080100 A1 | | 4/2007 | Bowman |

FOREIGN PATENT DOCUMENTS

| | | |
|---|---|---|
| ES | 2151811 A1 | 1/2001 |
| JP | H11-030413 A | 2/1999 |
| JP | 2005087935 A | 4/2005 |
| JP | 2005169184 A | 6/2005 |
| JP | 2007021333 A | 2/2007 |
| KR | 20060095273 A | 8/2006 |
| WO | 2005033023 A1 | 4/2005 |
| WO | 2007063395 A2 | 6/2007 |
| WO | 2007108008 A2 | 9/2007 |

OTHER PUBLICATIONS

International Search Report for International Application No. PCT/NZ2007/000297, Published: Mar. 11, 2008, pp. 1-6, Publisher: International Search Authority.

Written Opinion of the International Search Authority for International Application No. PCT/NZ2007/000297,Published: Mar. 11, 2008, pp. 1-23, Publisher: International Search Authority.

* cited by examiner

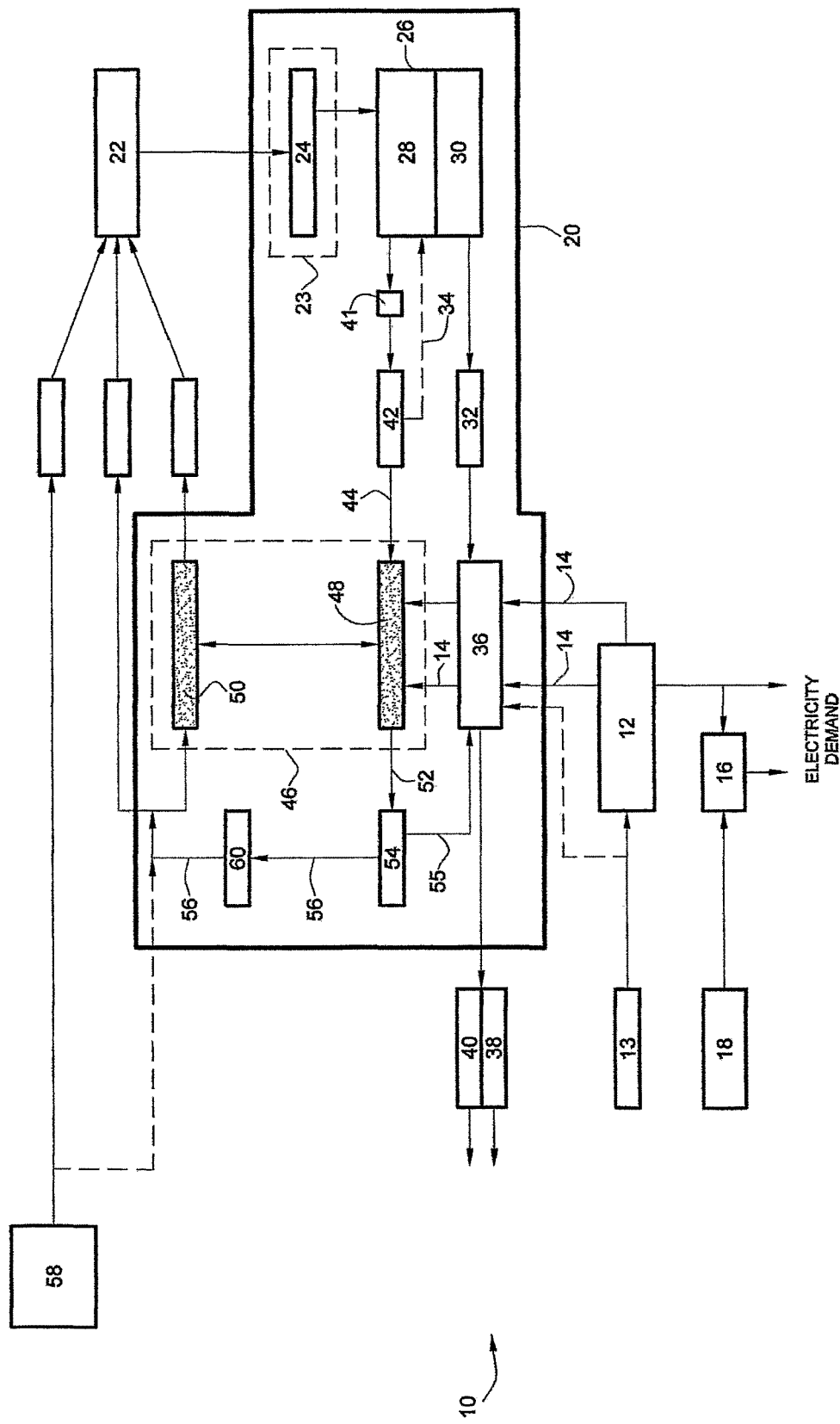

INTEGRATED UTILITY SYSTEM

CROSS-REFERENCE TO RELATED APPLICATIONS

This application is a U.S. national phase under the provisions of 35 USC § 371 of International Application No. PCT/NZ07/00297 filed Oct. 8, 2007, which in turn claims priority of Australian Patent Application No. 2006905601 filed Oct. 9, 2006. The disclosures of such international application and Australian priority application are hereby incorporated herein by reference in their respective entireties, for all purposes.

FIELD OF THE INVENTION

The present invention relates to an integrated utility system. More particularly, the integrated utility system of the present invention is intended to recycle waste energy for the treatment of wastewater to a quality that enables it to be combined with an existing water supply and reused.

BACKGROUND ART

Domestic and non-domestic properties require utilities such as power, water, water heating and sewage disposal. Most properties rely upon connection to reticulated services, which cannot be available to all prospective building locations, especially those beyond urban centres. The infrastructure for the provision of such services cannot meet increasing demand, nor can it continue to be expanded infinitely. Additionally, provision of these utilities to remote locations is inefficient and costly. Furthermore, the provision of utility services from centralised plants can also be vulnerable to disruption through natural disaster and infrastructure failure. Damage to a centralised plant can potentially have a significant impact to a large portion of a population if they are all interconnected to the same plant.

Power Supply

Conventional power supply comes from centralised, large scale power generation stations, with electricity reticulated to the population centres via transmission and distribution networks. Power demand increases continuously, requiring increased capacity for this capital intensive infrastructure. Long term planning requirements are based upon estimated projections and are removed from the decision making at a local level where the drive for capacity growth is typically generated.

Also, meeting short term peak demand levels often comes at a high marginal cost. Power supply contracts to the user are becoming more weighted to fixed line charges over variable consumption charges in order to provide investment certainty in power generation and transmission network capacity. This indirect supply vs. consumption relationship diminishes the incentive for energy efficiency at the user level.

The majority of power generation relies upon fossil fuelled thermal power, which carries with it the consequence of greenhouse gas emissions. Biofuels are generally uncompetitive for large scale centralised power generation, and renewable alternatives are less manageable and less developed and cannot be relied upon for base load generation.

On-site power generation is a long-established alternative, using engine driven generators. These are typically unsophisticated in their performance, use management and are generally a last-resort option. Improvements are emerging, such as home sized Stirling engine and gas turbine systems, invariably fossil fuelled, which can provide combined heat and power to the property if configured appropriately. Further, none of these power generation systems have been designed to interact with household water and wastewater systems for the purpose of sanitising and recirculating water to the household.

Solar and wind power systems for individual dwellings are also becoming popular, and are acceptable options for low intensity energy capture/generation. However, there is no guarantee for continuity in supply or matching demand using these systems, nor can they economically provide for high power and peak load demands.

Wastewater Treatment

Centralised sewage treatment, where each property is connected to the sewer system for conveyance to a large centralised wastewater treatment plant ("WWTP"), is relatively common in most urban centres. Various treatment processes are utilised to treat wastewater, with biological processes, more particularly activated sludge processes, being the predominant methods.

Until recently, most treated sewage effluent was discharged to local receiving waters or the ocean. More recently there has been a trend to add tertiary treatment processes to the basic activated sludge process to improve effluent quality and allow indirect reuse of the effluent via subsurface injection into aquifers or recycle to dams, which are used as a source of drinking water.

Excess sludge from large centralised WWTPs is usually mechanically dewatered and then disposed either to landfill or used in agriculture as a fertiliser supplement. In highly populated urban areas, excess sludge is often incinerated as the preferred disposal option. Today, most large centralised WWTPs produce two adverse discharges to the environment, that is, the treated effluent and excess sludge. The wastewater and sludge treatment/disposal processes are fairly significant generators of greenhouse gases, both carbon dioxide and methane in particular, being generated over time from sludge which is land applied or landfilled.

Centralised wastewater treatment is expensive and installation of reticulation systems is becoming more of a constraint in new urban developments. With the emergence of reliable membrane-based treatment processes there is now a global trend to more decentralised wastewater treatment systems.

The most common single dwelling wastewater treatment process is the septic tank system. This involves no mechanical components but requires large vessels for crude biological treatment of the wastewater and retention of the sludge, which is typically pumped out about once every 5 years or so, for landfill disposal elsewhere. The effluent from the septic tanks is then typically sub-surface irrigated in a French drain system, with the wastewater often ultimately discharging to receiving waters. In many parts of the world these discharges have caused severe environmental impacts in the receiving waters, predominately through eutrophication of the water body from the nutrients associated with the wastewater.

To overcome some of these problems aerobic treatment units ("ATUs") are often provided. These are small mechanical biological treatment units that provide a higher level of wastewater treatment than septic tanks but they still rely on disposal of the contaminated effluent to the environment, often again reaching sensitive water bodies. These ATUs require routine maintenance and monitoring to ensure they are working to design specifications and generally involve large tankage requirements, typically in the order of many thousands of litres. There is also concern regarding greenhouse gas emissions, especially methane from any uncontrolled anaerobic digestion.

The operating efficiency of the biological processes common to all these treatment systems can be highly sensitive to their maintenance and operating conditions, and especially to excessive loadings of commonly used household chemical products.

In sensitive ecological environments, disposal of treated wastewater to local water bodies, often via percolation through the ground, is not acceptable. There is thus a need for a reliable and robust wastewater treatment process, for single-dwelling applications, where the wastewater can be treated to a level to allow reuse and hence eliminate any adverse discharge to the environment. It is necessary that this be achieved at moderate cost.

The lack of possible connection to centralised wastewater treatment schemes is often the major limitation in local authority approval to release rural land for residential development, especially single sites.

Water Conservation

An increasing global concern is the finite supply of water, with increasing demand on a limited supply as drawn from the local, natural environment. Conventional housing developments expect to be connected to a reticulated utility supply, all necessarily treated to a potable quality, although, only a small proportion of the water is actually used for drinking purposes.

Those located outside urban areas may not have access to mains water supplies. This may require them to either draw from a natural water course, or aquifer, or rely upon roof collected rainwater. In addition to locational constraints each option poses quality and quantity issues in assuring continuity of supply. Water conservation can be practiced with installations specifically designed for economy in use, but there is no existing method for on-site recycling of black wastewater as the means to reduce net consumption.

U.S. Pat. No. 4,052,858 discloses the utilisation of a waste heat stream from a power source to sterilise water. However, the method provided in this document does not provide the means for the on-site sterilisation of wastewater to "white water" quality, and its subsequent reintegration with a primary water supply. Furthermore, this document does not disclose the separation and treatment of sludge or the utilisation of waste heat for water, building or space heating. That is, the wastewater treatment systems of the prior art do not disclose a fully integrated system which provides for the on-site recirculation and reuse of water and energy.

The integrated utility system of the present invention has one object thereof to overcome substantially the abovementioned problems of the prior art or at least provide a useful alternative thereto.

The discussion of the background art is included exclusively for the purpose of providing a context for the present invention. It should be appreciated that the discussion is not an acknowledgement or admission that any of the material referred to was common general knowledge in the field relevant to the present invention in Australia or elsewhere before the priority date.

Throughout the specification, unless the context requires otherwise, the word "comprise" or variations such as "comprises" or "comprising", will be understood to imply the inclusion of a stated integer or group of integers but not the exclusion of any other integer or group of integers.

Throughout the specification, the term "power supply" is understood to refer to an electrical power generating system including, but not limited to engine/generators, solar and wind power generators and burner/boiler thermal power generators.

Throughout the specification the term "waste energy" is understood to refer to any one or more of the by-product thermal energy or excess electrical energy from the power supply.

DISCLOSURE OF THE INVENTION

In accordance with the present invention there is provided an integrated utility system comprising;
a power supply;
a wastewater treatment system; and
a sludge combustion unit for the treatment of waste material having solids content
wherein power generated by. the power supply is directed to a site and waste energy from the power supply is captured and recycled for re-use at the site, including use in wastewater treatment system and sludge combustion unit, and treated water recovered from the wastewater treatment system is available for direct re-use at the site.

Preferably, treated water from the wastewater treatment system may be used in addition to a primary water supply.

Preferably, the waste energy is in the form of waste thermal energy.

Preferably, the sludge combustion unit processes waste solids and/or sludge material exiting any one. or more of a macerator unit, a dewatering unit or a thickening unit.

Preferably, the power supply comprises any power generation device that emits waste energy as a by-product.

More preferably, the power supply comprises any one or more of a combustion engine or a fuel cell. Where the power supply is a combustion engine, this may comprise for example, any one or more of a diesel cycle, Otto cycle reciprocating engine, a Stirling cycle or a mini gas turbine. Preferably, the power supply is water or liquid cooled to enable the waste energy to be channelled to the water supply and wastewater treatment system.

Still preferably, the power supply further comprises a power storage device, for example a battery, to enable a base level of power to be supplied without the requirement for the power supply to be operating, or to provide supplementary power during peak demand periods.

Still further preferably, the power supply is coupled with alternative supplementary power supplies, for example solar and wind generators, to minimise fuel consumption and the load on the power supply and reduce environmental impact.

Excess energy generated by the power supply and not utilised by the site or in the wastewater or solids treatment systems is preferably stored in the storage device.

The fuel source for the power supply preferably comprises any chemical energy medium which is suitable for the power supply device.

More preferably, the fuel source for the power supply at least partially comprises any one of bio-fuel or hydrogen.

Preferably, the power supply is coupled with a heating system for a building or property, including water heating.

The power supply is also preferably designed to deliver the voltage and frequency required depending on the particular country for which it is in use.

Operation of the power supply is preferably regulated by a computerised supervisory control and data acquisition ("SCADA") system.

Operation of the wastewater treatment system is preferably regulated by the SCADA system.

The SCADA is preferably linked by telemetry to a centralised service support function for remote monitoring of performance, reliability and fault diagnosis.

Preferably, the power supply is able to be operated at zero generator load in the event that it is required to specifically produce waste energy for the water supply or wastewater treatment system.

Still preferably, the power supply also comprises an auxiliary power supply to provide additional heating and/or electricity during peak demand periods.

The primary water supply is preferably accessed from a reticulation supply connection, delivered by a tanker or collected as rainwater into an on-site storage facility, and is of potable standard. Where the primary water supply is not of potable standard, the primary water supply is preferably circulated through the wastewater treatment system to treat the primary water supply to potable standard.

The wastewater treatment system preferably comprises a macerator unit to homogenise waste material, a dewatering unit to separate aqueous phase from the sludge/solids phase, a thickening unit to maximise the solids content in the sludge phase, a sludge drying and combustion unit, a water sterilisation unit to treat the aqueous phase from the dewatering unit, and a water polishing unit.

Preferably, the aqueous phase undergoes a pre-treatment step prior to the sterilisation unit, to maximise the removal of solids and resulting in a secondary sludge phase.

Preferably, the secondary sludge phase is recirculated back to the dewatering unit.

A holding tank is preferably provided after the dewatering unit to regulate any downstream batch treatment flow rates.

The macerator unit is preferably fitted with screens prior to the settling step to aid the removal of gross solids, wherein gross solids may comprise one or more of bio-active solids or non-organic solids.

Preferably, the dewatering unit comprises any one or more of a settler and thickener, mechanical screw press, clarifier, decanting centrifuge and/or chemical addition to enhance phase separation.

Still preferably, the solids content of the sludge resulting from the thickening unit is at least about 8%.

Still further preferably, the waste energy for the sludge combustion unit can be supplemented through auxiliary fuel combustion from a fuel stream supplied to the power supply.

The sludge phase and aqueous phase processing is preferably performed in batch mode when the power supply is in operation, and under the control of the SCADA system.

Preferably, a separate solids incinerator is annexed to or incorporated within the sludge combustion unit for the destruction and sterilisation of the gross solids screened prior to the settling step and/or other waste material that would normally be disposed of through garbage collection.

The solids incinerator and/or sludge combustion unit preferably incorporates an exhaust tract. The exhaust tract preferably includes at least one of cyclone separator or a means for either electrostatic precipitation or particulate filtration, to facilitate the removal of sterile ash residue resulting from incineration and/or combustion.

Preferably, the chemical composition of the sterile ash residue may be utilised in the form of fertiliser due to the concentration of inorganic elements, such as phosphorous and potassium, therein.

Preferably, the macerator unit is incorporated within a wet well to control the waste feed rate through the wastewater treatment system.

Still preferably, the macerator unit comprises further mechanical or chemical devices to enhance separation, for example a chemical coagulant injection to enhance solids removal and/or precipitation in the dewatering stage.

The pre-treatment step preferably, comprises micro-filtration to maximise the removal of solid matter.

Preferably, the pre-treatment step results in the minimisation of Biological Oxygen Demand ("BOD"), Chemical Oxygen Demand ("COD"), nitrogen and phosphorous concentrations in the resulting effluent stream.

Still preferably, the concentrations of BOD, nitrogen and phosphorous do not exceed 10, 10 and 1 mg/L, respectively.

Still further preferably, the concentrations of BOD, COD, nitrogen and phosphorous are further minimised through the use of techniques such as chemical oxidation, ion exchange, reverse osmosis or carbon filtration.

Sterilisation of an effluent stream resulting from the pre-treatment step is preferably achieved through the use of an integrated insulated steriliser and water heating unit.

Preferably, the integrated steriliser and water heating unit is maintained at a temperature of at least about 70° C.

Still preferably, the residence time of the effluent stream in the integrated steriliser and water heating unit is at least about 30 minutes.

Preferably, the cycling of the effluent stream through the sterilisation system is controlled by the SCADA system.

The water polishing unit preferably comprises any one or more of nanofiltration, reverse osmosis, activated carbon filtration and chemical disinfection. The retention time of the water in the polishing unit will be dependent on the physical and/or chemical processes utilised and may require that the polishing unit be sized accordingly to impart some holding capacity.

A bleed stream from the polishing unit is preferably directed back to the sludge drying and combustion unit.

Preferably, the water exiting the water polishing unit is of the same quality as the water from the primary water supply.

Still preferably, the polished water passes through a heat exchanger should cooling be required. In this way, waste energy from the heat exchanger may be retained within the wastewater treatment system to be utilised elsewhere.

Treated water is preferably recycled to the property for re-use after it has been treated by the wastewater treatment system.

Preferably, at least one stream of treated wastewater returns to the property via the water heating unit.

Still preferably, waste energy from the heat exchanger is directed to the treated wastewater stream entering the water heating unit. Alternatively, the waste energy from the heat exchanger may be used to preheat the inflow of the waste material to the dewatering unit to improve the efficiency of phase separation.

Preferably, the recycled wastewater stream is supplemented by the primary water supply.

Exhaust gas emissions from the sludge drying and combustion unit in the wastewater treatment system are preferably combined with emissions from the power generator.

Preferably, the exhaust gas emission temperature is monitored and managed by the SCADA system.

Still preferably, emissions control after-treatment techniques are employed to minimise pollution should emission levels exceed local emission control limitations.

Preferably, the waste energy from the power supply sterilises and deactivates any bio-active material.

Preferably, the integrated utility system allows the site to remain independent of supply of reticulated and/or centralised utility services.

In accordance with the present invention there is further provided a method for the on-site use of waste energy from a power supply, the method comprising the steps of directing waste energy from the power supply to a wastewater treatment system and sludge combustion unit, in which the waste energy is utilised, at least in part, to treat wastewater and waste solids on-site, and the treated wastewater, and waste energy from the power supply are, at least in part, recovered and available for direct re-use at the site.

The power supply and wastewater treatment system may be as described above.

BRIEF DESCRIPTION OF THE DRAWINGS

The present invention will now be described, by way of example only, with reference to one embodiment thereof and the accompanying drawing, in which:

FIG. 1 is a flow sheet of the integrated utility system of the present invention.

EXAMPLES

To indicate the performance of the wastewater treatment methods to be utilised in the integrated utility system, a number of treatment processes were evaluated at bench scale using primary effluent from a large metropolitan sewage treatment plant. The treatment methods included micro-filtration, chemical oxidation, reverse osmosis and granular activated carbon adsorption.

The primary effluent from the sewage treatment plant was first filtered through commercial micro-filtration cartridges (5 micron and then 0.5 micron cartridges). The effluent from the micro-filtration, heated to 45° C. was then chemically oxidised with hydrogen peroxide using a complete mix reactor with a 60-minute retention time. Peroxide was added at the 1.5 times the stoichiometric addition rate, based on chemical oxygen demand. The chemically oxidised effluent was then passed through a commercial RO (reverse osmosis) filter cartridge and finally the RO effluent was contacted with commercial granular activated carbon (GAC) at a dose rate of 10 g/L with a 60-minute retention time. All samples were analysed for Biochemical Oxygen Demand (BOD), Total Suspended Solids (TSS), Total Nitrogen (TN), Total Kjeldahl Nitrogen (TKN) and Total Oxidised Nitrogen ($NO_t$). Results from this test work are shown in Table 1 below.

TABLE 1

Test Results (all in mg/L)

| Parameter | Primary Effluent | Micro-filtered Effluent | Chemical Oxidation Effluent | RO Effluent | GAC Effluent |
|---|---|---|---|---|---|
| BOD | 120 | 120 | <5 | <5 | <5 |
| TSS | 120 | 45 | 22 | <1 | <1 |
| TN | 41.1 | 42.4 | 34 | 5.1 | 5.1 |
| TKN | 41.1 | 42.4 | 34 | 5.1 | 4.6 |
| $NO_t$ | 0 | 0 | 0 | 0 | 0.5 |

These results clearly show the efficacy of the treatment operations to produce an effluent suitable for reuse as a non-potable water supply in the household. The treated effluent was completely clear and colourless and to all intents, looked like commercial potable water.

Best Mode(S) for Carrying out the Invention

In FIG. 1 there is shown a flow sheet of an integrated utility system 10 in accordance with the present invention. A power supply 12, for example a combustion engine or fuel cell, produces electricity for the property and waste energy, in the form of waste thermal energy 14 as a by-product.

The power supply 12 uses a fuel supply 13 comprising any chemical energy medium which is suited to the engine device and operating cycle. It would be desirable for bio-fuels to be utilised to reduce greenhouse gas emissions.

The power supply 12 is also equipped with a power storage device 16, for example a battery, and is coupled with supplementary alternative power supplies 18 for example solar panels or wind generators, to minimise fuel consumption and the operating time required of the power supply 12, in addition to reducing environmental impact. The power supply 12 can be designed to deliver the required voltage and frequency desired, dependent upon the country in which it is intended to be used.

Waste thermal energy 14 is then channelled from the power supply 12 to a wastewater treatment system 20. The power supply 12 may also be operated at zero generator load in the event that it is required to specifically produce waste thermal energy 14 for the wastewater treatment system 20. Excess energy generated by the power supply 12 is stored in the power storage device 16 for later use.

Wastewater and solids from the property 22 is diverted through to a wet well 23 containing a macerating unit 24 in which the waste matter is first passed over coarse screens to mechanically filter off any gross solids. The gross solids can include organic solids and/or non-organic solids. The waste organic solids passing through the screens is then homogenised and directed to a dewatering unit 26 where the waste material is separated into an aqueous phase 28 and a sludge phase 30. The macerator unit 24 may be equipped with mechanical or chemical devices to enhance separation in the dewatering unit 26, for example addition of a chemical coagulant to enhance precipitation. The wet well 23 acts as a storage tank and is sized to control the waste feed rate through to the wastewater treatment system. For example, assuming a household water consumption of 900 L/day, the capacity of the equalisation tank 23 should be approximately 250 L.

The sludge phase 30 undergoes thickening in a thickening unit 32, such that the final solids content is at least about 8%. The sludge exiting the thickening unit 32 is transferred to a sludge drying and combustion unit 36.

The sludge combustion unit 36 utilises waste thermal energy 14 from the power supply 12 to dry, char and ultimately incinerate the sludge material. Supplementary heat, if required, is generated by combustion of auxiliary fuel from the fuel supply 13. The resulting sterile ash residue 38 is disposed of directly to waste or collected during routine maintenance. The sterile ash residue 38 may contain beneficial inorganic elements such as phosphorous and potassium and may therefore be utilised as fertiliser, thus enabling the re-use of any latent chemical value in the final waste product. The gas exhaust emissions 40 comprise combined exhaust from the power supply 12 and the sludge combustion unit 36.

Processing of the sludge phase 30 and the aqueous phase 28 is ideally performed in batch mode when the power supply is in operation. The utilisation of the waste thermal energy 14 for the treatment of the sludge phase 30 and/or the aqueous phase 28 ultimately sterilises and deactivates any bioactive material present.

The aqueous phase 28 produced in the settler unit 26 is transferred to a holding tank 41, to regulate downstream batch treatment flow rates. The aqueous phase 28 then undergoes a pre-treatment step 42 for example microfiltration, resulting in an effluent stream 44 and a secondary sludge phase 34. The aim here is to minimise solids content in addition to BOD, nitrogen and phosphorous concentrations, which ideally do not exceed 10 mg/L, 10 mg/L and 1 mg/L, respectively. The secondary sludge phase 34 is recirculated back to the dewatering unit 26.

The effluent stream 44 is diverted through a sterilisation unit 46, where waste thermal energy 14 is again utilised. The sterilisation unit 46 in turn comprises an integrated insulated steriliser 48 and water heating unit 50. The waste thermal energy 14 maintains the temperature of the sterilisation unit at about 70° C. or higher for a residence time of at least about 30 minutes.

A sterilised effluent stream 52 then proceeds through to a water polishing unit 54 which involves the use of one or more of a number of techniques for example, nanofiltration, reverse osmosis, activated carbon filtration and chemical disinfection. A bleed stream 55 directs any remaining contaminated water back to the sludge drying and combustion unit 36 where it is converted to steam and released with the ash 38 and gas exhaust emissions 40.

It is envisaged that the retention time of the water in the polishing unit will be dependent on the physical and/or chemical processes utilised and may require that the polishing unit be sized accordingly to impart some holding capacity.

The product of the polishing unit 54 is known as "white water" 56. White water is described as water suitable for re-use, up to a potable quality such as that drawn from a primary water supply 58, for example rainwater, water delivered by tanker, or water from a reticulation supply connection.

The white water 56 is recycled to the property 22 directly or via the water heating unit 50. Water from the primary water supply 58 may also be fed into the white water stream 56 to make up any losses incurred in the wastewater treatment system 20. The white water 56 may also need to pass through a heat exchanger 60 prior to being directed back to the property should it still retain some waste thermal energy 14 from the sterilisation unit 46. The heat exchanger 60 directs the waste thermal energy 14 to white water 56 entering the water heating unit 50. Alternatively, the heat exchanger 60 may direct waste thermal energy 14 to the waste material entering the settler unit 26 to improve the efficiency of phase separation.

The primary water supply 58 is maintained as a separate line for direct use in the property 22. However, where the primary water supply 58 is not of potable standard, it may be directed to the wastewater treatment system 20 for treatment therein, prior to being directed to the property 22.

It is envisaged that the integrated utility system may be controlled and regulated by a computerised system control and data acquisition ("SCADA") system. The SCADA system may also be linked telemetrically to a service support function for remote monitoring of performance, reliability and fault diagnosis. This will also monitor and record the carbon credits resulting from the use of bio-fuels.

Where the power supply 12 is a combustion engine it may comprise for example, any one or more of a diesel cycle, Otto cycle reciprocating engine, a Stirling cycle or a mini gas turbine.

It is anticipated that where applicable, the power supply may use 100% biofuels or hydrogen thereby eliminating greenhouse gas emissions from the integrated utility system. Where the use of non-volatile fuels such as diesel or biodiesel are used, it is envisaged that a fuel tank may be included within the integrated utility system. The fuel tank may be provided as a slab shaped container forming one wall of the integrated utility system. The general ambient temperature within the module may, it is envisaged, be advantageous in preventing cold flow problems with diesel and bio-fuels commonly encountered in extreme winter conditions when remote fuel tanks are used.

It is further envisaged that the power supply 12 can be water or liquid cooled, the coolant flow providing an additional or alternative method for channelling the waste thermal energy 14 to the wastewater treatment system 20.

The use of waste thermal energy 14 from the power supply 12 in a heating system for a building or property is also anticipated.

A skilled addressee would understand that an auxiliary power supply may be used to provide additional heating and/or electricity during peak demand periods.

Dewatering may be achieved using many methods, for example a mechanical screw press, a settler and thickener, clarifier, decanting centrifuge, or chemical addition to enhance phase separation.

The treatment of BOD, COD, nitrogen and phosphorous in the sterilised effluent stream 52 is generally achieved through the use of techniques including but not limited to, chemical oxidation, ion exchange, reverse osmosis and carbon filtration.

A separate solids incinerator may also be annexed to or incorporated within the sludge combustion unit 36 for the incineration and/or sterilisation of solids screened out in the macerator unit 24 and/or other organic waste that would normally be disposed of through garbage collection.

The gas exhaust emissions 40 may undergo after treatment techniques for example, catalytic oxidation, selective catalytic reduction, particulate filtration, exhaust gas scrubbing. Each treatment technique should aid to minimise pollution, although pollution is envisaged to be naturally quite low.

Inorganic ash residue resulting from incineration/combustion may be separated from the gas exhaust emissions 40 by any one of cyclone separation, electrostatic precipitation or particulate filtration. The inorganic ash residue may be disposed of directly due to its sterile and inert nature, or collected for removal during any routine maintenance procedure and may be used as, for example fertiliser.

It is envisaged that the incorporation of the integrated utility system may be the form of an "site specific" system, enabling a property to remain independent of any reticulated utility services, conserve water consumption and may obviate the discharge of any adverse contaminants to the environment, including greenhouse gases and biologically active contaminants.

Net water consumption of a site may be reduced by as much as 90% due to a significant volume of wastewater being recycled. Further, overall energy efficiency is maximised, attaining potentially greater than 90% efficiency, as power and heat are created only as required, and all energy streams are used beneficially. It is expected that the integrated utility system of the present invention will aid the monitoring and recording of carbon credits to a level of accountability suitable for carbon trading. This "real time" monitoring will facilitate the regular review of energy consumption and more energy efficient practices implemented. As a result, it is expected that the overall carbon footprint of a property may be significantly reduced.

As an on-site facility (independent of large reticulated network utility services), it is envisaged that the integrated utility system will provide security against infrastructure breakdown. Further, as the integrated utility system is directly monitored, any signs of failure will be automatically signalled, and service support dispatched if required. Further, the nature of the design and components is intended to allow for immediate on-site replacement. Replaced items are intended to be capable of being mobilised to centralised facilities for reconditioning and reuse.

Installation of the integrated utility system is expected to be more cost effective and significantly simpler as no connections to large reticulated utility systems are required. Further, the land area typically required by effluent drainage from septic systems is substantially reduced.

A significant advantage of an integrated utility system is thought to be the recycling of thermal and chemical energy within the system and the ability for substantially all organic waste streams produced by a property to be sterilised, bio-active material deactivated, and the resulting material safely re-used as, for example, fertiliser.

Modifications and variations such as would be apparent to the skilled addressee are considered to fall within the scope of the present invention.

The invention claimed is:

1. An integrated utility system for providing recirculation and reuse of water and energy on-site at a property, the integrated utility system comprising:
   a power generation device having a fuel supply and arranged (1) to produce and deliver electricity to the property and (2) to produce waste thermal energy as a by-product;
   a wastewater treatment system arranged to (1) receive wastewater from the property, (2) treat the wastewater, and (3) recycle the treated wastewater to the property for reuse, the wastewater treatment system comprising:
   a macerator unit for homogenizing waste material;
   a dewatering unit for separating an aqueous phase from a sludge phase;
   a thickening unit for maximizing solids content in the sludge phase;
   a sludge drying and combustion unit for receiving the sludge phase;
   a water sterilization unit for treating the aqueous phase from the dewatering unit; and
   a water polishing unit arranged to treat sterilized water from the water sterilization unit and provide polished sterilized water for reuse on-site at the property,
   wherein the integrated utility system is adapted to direct waste thermal energy from the power generation device to:
   the sludge drying and combustion unit for treating the sludge phase to dry, char, and incinerate the sludge phase, to obtain exhaust gas and sterile ash residue; and
   the water sterilization unit for treating the aqueous phase for production of the sterilized water.

2. An integrated utility system according to claim 1, further comprising a primary water supply.

3. An integrated utility system according to claim 1, wherein the power generation device:
   (a) is liquid cooled, and the waste thermal energy of the liquid is used in the wastewater treatment system; and/or
   (b) further comprises a power storage device; and/or
   (c) is coupled with a heating system for the property.

4. An integrated utility system according to claim 1, further comprising energy recycling systems, wherein integrated operation of the power generation device, wastewater treatment and energy recycling systems is regulated by a computerized supervisory control and data acquisition ("SCADA") system.

5. An integrated utility system according to claim 4, wherein the SCADA is linked by telemetry to a centralized service support function for remote monitoring.

6. An integrated utility system according to claim 2, wherein the primary water supply is of potable standard.

7. An integrated utility system according to claim 1, the wastewater treatment system further comprising one or more pre-treatment units adapted to provide a pre-treatment of the aqueous phase produced by the dewatering unit, wherein the pre-treatment is selected from the group consisting of microfiltration, chemical oxidation, reverse osmosis, ion exchange, and carbon filtration, and wherein the pre-treatment unit is located upstream of the sterilization unit, and wherein the pre-treatment is effective to minimize the concentration of solids, Biochemical Oxygen Demand ("BOD"), Chemical Oxygen Demand ("COD"), nitrogen and phosphorous entering the sterilization unit.

8. An integrated utility system according to claim 1, wherein the dewatering unit comprises any one or more of a mechanical screw press, clarifier, decanting centrifuge, settler and thickener and/or chemical addition to enhance phase separation.

9. An integrated utility system according to claim 1, wherein the thickening unit is adapted to produce a sludge having a solids content of at least 8%.

10. An integrated utility system according to claim 1, wherein the sludge drying and combustion unit further comprises a solids incinerator.

11. An integrated utility system according to claim 7, wherein the one or more pre-treatment units conduct chemical oxidation, reverse osmosis, ion exchange, or carbon filtration and are effective to minimize the concentration of BOD, nitrogen and phosphorous to produce an effluent stream in which the concentrations of BOD, nitrogen and phosphorous do not exceed 10, 10 and 1 mg/L, respectively.

12. An integrated utility system according to claim 7, the wastewater treatment system further comprising an integrated insulated sterilizer and water heating unit in which an effluent stream resulting from the pre-treatment step is sterilized.

13. An integrated utility system according to claim 1, wherein the power generation device is adapted to direct the waste thermal energy to any one or more of:
   (a) sterilizing and de-activating any bio-active material;
   (b) space heating.

14. An integrated utility system according to claim 1, wherein the water polishing unit comprises any one or more of nanofiltration, reverse osmosis, activated carbon filtration and chemical disinfection.

15. An integrated utility system according to claim 1, the wastewater treatment system further comprising a water heating unit through which water exiting the water polishing unit is passed.

16. An integrated utility system according to claim 1, the wastewater treatment system further comprising a water heating unit through which at least one stream of water exiting the wastewater treatment system is recycled to the property.

17. An integrated utility system according to claim 1, the integrated utility system being adapted to combine exhaust gas emissions from the sludge drying and combustion unit and emissions from the power generation device.

18. A method for providing recirculation and reuse of water and energy on-site at a property, the method comprising:

supplying fuel from a fuel supply to operate a power generation device arranged to produce and deliver electricity to the property and to produce waste thermal energy as a by-product;

operating a wastewater treatment system to receive wastewater from the property, treat the wastewater and recycle the treated wastewater to the property for reuse, the method of operating the wastewater treatment comprising:

homogenizing waste material in a macerator unit;

separating an aqueous phase from a sludge phase in a dewatering unit;

maximizing solids content in the sludge phase in a thickening unit;

receiving the sludge phase in a sludge drying and combustion unit;

treating the aqueous phase from the dewatering unit in a water sterilization unit; and treating the aqueous phase from the water sterilization unit in a water polishing unit to provide polished sterilized water for reuse on-site at the property, wherein the method further comprises directing the waste thermal energy from the power generation device to:

the sludge drying and combustion unit for treating the sludge phase to dry, char, and incinerate the sludge phase, to obtain exhaust gas and sterile ash residue; and the water sterilization unit for treating the aqueous phase.

\* \* \* \* \*

UNITED STATES PATENT AND TRADEMARK OFFICE
CERTIFICATE OF CORRECTION

PATENT NO. : 10,029,933 B2
APPLICATION NO. : 12/445064
DATED : July 24, 2018
INVENTOR(S) : Trevor Redvers Bridle Page 1 of 1

It is certified that error appears in the above-identified patent and that said Letters Patent is hereby corrected as shown below:

On the Title Page

Item [73], delete "Trevor Redvers Bridle, Perth (AU)" and insert -- Ian Moncrieff, Marlborough (NZ) --.

Signed and Sealed this
Fourth Day of June, 2019

Andrei Iancu
*Director of the United States Patent and Trademark Office*